United States Patent
Spaziante et al.

(10) Patent No.: US 9,680,174 B2
(45) Date of Patent: Jun. 13, 2017

(54) REDOX FLOW BATTERY SYSTEM AND METHOD OF CONTROLLING IT

(71) Applicant: Hydraredox Technologies Holdings Ltd., Wirral (GB)

(72) Inventors: Placido Maria Spaziante, Bangkok (TH); Michael Dichand, Nussdorf (AT)

(73) Assignee: HYDRAREDOX TECHNOLOGIES HOLDINGS LTD., London (GB)

( * ) Notice: Subject to any disclaimer, the term of this patent is extended or adjusted under 35 U.S.C. 154(b) by 40 days.

(21) Appl. No.: 14/652,058

(22) PCT Filed: Dec. 14, 2012

(86) PCT No.: PCT/IB2012/057342
§ 371 (c)(1),
(2) Date: Jun. 12, 2015

(87) PCT Pub. No.: WO2014/091283
PCT Pub. Date: Jun. 19, 2014

(65) Prior Publication Data
US 2015/0325874 A1 Nov. 12, 2015

(51) Int. Cl.
*H01M 8/04* (2016.01)
*H01M 4/86* (2006.01)
(Continued)

(52) U.S. Cl.
CPC ..... *H01M 8/04955* (2013.01); *H01M 4/8615* (2013.01); *H01M 4/96* (2013.01);
(Continued)

(58) Field of Classification Search
CPC .. H01M 8/04955; H01M 4/8615; H01M 4/96; H01M 8/0438; H01M 8/04544;
(Continued)

(56) References Cited

U.S. PATENT DOCUMENTS 4,786,567 A 11/1988 Skyllas-Kazacos et al.
6,475,661 B1 * 11/2002 Pellegri .................. H01M 2/40
429/105

(Continued)

FOREIGN PATENT DOCUMENTS

GB 2030349 4/1980
JP H07192747 A 7/1995
(Continued)

OTHER PUBLICATIONS

International Search Report issued in PCT Application No. PCT/IB2012/057342, Aug. 1, 2013.
(Continued)

*Primary Examiner* — Gregg Cantelmo
(74) *Attorney, Agent, or Firm* — Lucas & Mercanti, LLP

(57) ABSTRACT

A novel multi cell stack architecture has specific features allowing deployment of simple electrical instrumentation of data collection/monitoring of crucial hydraulic, electrical and electrochemical quantities, on the basis of which the operator or electronic controller is able to gather/process critical information of such a depth and enhanced reliability, for immediately identifying any cell in "state of sufferance" and eventually to exclude it from the system and possibly substitute it with a spare cell. A method of monitoring/controlling the operation of an all-vanadium redox flow battery system is also disclosed.

8 Claims, 12 Drawing Sheets

(51) Int. Cl.
*H01M 4/96* (2006.01)
*H01M 8/18* (2006.01)
*H01M 8/20* (2006.01)
*H01M 8/24* (2016.01)
*H01M 8/02* (2016.01)
*H01M 8/04955* (2016.01)
*H01M 8/0438* (2016.01)
*H01M 8/249* (2016.01)
*H01M 8/04537* (2016.01)
*H01M 8/04664* (2016.01)
*H01M 8/0206* (2016.01)
*H01M 8/0213* (2016.01)
*H01M 8/0228* (2016.01)
*H01M 8/0273* (2016.01)
*H01M 8/0276* (2016.01)
*H01M 8/0297* (2016.01)

(52) U.S. Cl.
CPC ..... *H01M 8/0438* (2013.01); *H01M 8/04544* (2013.01); *H01M 8/04552* (2013.01); *H01M 8/04574* (2013.01); *H01M 8/04671* (2013.01); *H01M 8/188* (2013.01); *H01M 8/20* (2013.01); *H01M 8/249* (2013.01); *H01M 8/0206* (2013.01); *H01M 8/0213* (2013.01); *H01M 8/0228* (2013.01); *H01M 8/0273* (2013.01); *H01M 8/0276* (2013.01); *H01M 8/0297* (2013.01); *H01M 8/04388* (2013.01); *H01M 8/04395* (2013.01); *H01M 8/245* (2013.01); *H01M 8/246* (2013.01); *Y02E 60/528* (2013.01)

(58) Field of Classification Search
CPC ......... H01M 8/04552; H01M 8/04574; H01M 8/04671; H01M 8/188; H01M 8/20; H01M 8/249; H01M 8/0206; H01M 8/0213; H01M 8/0228; H01M 8/0273; H01M 8/0276; H01M 8/0297; H01M 8/04388; H01M 8/245; H01M 8/246
See application file for complete search history.

(56) References Cited

U.S. PATENT DOCUMENTS

| | | | |
|---|---|---|---|
| 2005/0074665 A1* | 4/2005 | Spaziante | H02M 7/155 429/50 |
| 2012/0082873 A1* | 4/2012 | Fischel | H01M 8/08 429/51 |
| 2012/0156535 A1 | 6/2012 | Harrer et al. | |
| 2013/0084506 A1* | 4/2013 | Chang | H01M 8/188 429/400 |
| 2014/0065460 A1* | 3/2014 | Evans | H01M 8/188 429/101 |

FOREIGN PATENT DOCUMENTS

| | | |
|---|---|---|
| JP | H07192748 A | 7/1995 |
| JP | 2005510194 A | 4/2005 |
| JP | 2006114360 | 4/2006 |
| JP | 2006114360 A | 4/2006 |
| WO | 9003666 | 4/1990 |
| WO | 9939397 | 8/1999 |
| WO | 0215317 | 8/2000 |
| WO | 0103213 | 1/2001 |
| WO | 0103224 | 1/2001 |
| WO | 0176000 | 10/2001 |
| WO | 03003483 | 1/2003 |
| WO | 03007464 | 1/2003 |
| WO | 03043170 | 5/2003 |
| WO | 2004079849 | 9/2004 |
| WO | 2012001446 | 1/2012 |
| WO | 2012020277 | 2/2012 |
| WO | 2012032368 | 3/2012 |
| WO | 2012042288 | 4/2012 |

OTHER PUBLICATIONS

Japanese Office Action for corresponding Japanese Patent Application No. 2015-547154 (Nov. 18, 2016) (17 Pages).

* cited by examiner

REDOX FLOW BATTERY SYSTEM AND METHOD OF CONTROLLING IT

CROSS-REFERENCE TO RELATED APPLICATIONS

This application is a 371 of PCT/IB2012/057342, filed Dec. 14, 2012.

BACKGROUND OF THE DISCLOSURE

1. Technical Field

This disclosure relates to redox flow battery systems for energy storage employing multi-cell electrochemical reactors composed of sequences of "filter press" assembled planar elements to form a battery stack and a method of monitoring operating conditions and controlling the functioning of every electrode of the multi-cell stack.

2. Description of Related Art

Redox flow battery systems are increasingly attracting interest as efficient energy conversion systems. Among the numerous redox couple candidates, the all vanadium redox system being one of the most preferred.

Structurally, the electrochemical reactors that have been proposed for redox flow battery systems, have been derived from the electrochemical reactor structures developed for general electrolysis processes, the only adaptation having concerned the materials employed as electrodes.

The documents GB-A-2,030,349, U.S. Pat. No. 4,786,567, WO99/39397, WO01/03213, WO01/03224, WO01/76000, WO02/15317, WO03/003483, WO03/007464, WO03/043170, WO2004/079849, EPRI, Technical Update Report, "Vanadium Redox Flow Batteries" (An In-depth analysis), ©-2007—Electric Power Research Institute, Inc., US-2012/0156535-A1; WO2012/001446, WO2012/020277, WO2012/032368, WO2012/042288, and in particular the article: "State of charge monitoring methods for vanadium redox flow battery control", Maria Skyllas-Kazacos, Michael Kazacos, School of Chemical Engineering, University of New South Wales, Sydney, NSW 2052, Australia, Journal of Power Sources: 196 (2011) 8822-8827, offer an ample review of the state of the art and a discussion of specific instrumental means of control of all-vanadium redox flow systems.

Typically, in redox flow storage systems besides absence of gas evolution (H2, O2 or other elements) at the electrodes under correct operating conditions, apart from minor accidental parasitic occurrences that must be absolutely be prevented or held at negligible levels, the electrodes themselves are chemically inert (i.e. do not undergo any modification at their surface wetted by the electrolyte solution). These conditions make mass transport of the redox process supporting ions to active electrode sites a most critical parameter, together with electrochemical and physical characteristics of the wetted surface of the electrode material, that affects the dynamics of ion oxidation and reduction at the respective electrodes of the electrochemical cell. For many of these systems, for example for the all vanadium (V/V redox flow cell systems and similar systems (Fe/V, V/Br, Cr/Fe, Zn/Ce, Polysulfide/Br), for economically acceptable current densities to be supported, porous and fluid permeable electrodes are necessary.

Moreover, chemical inertness of the electrode materials that need to be retained when switching from cathodic polarization to anodic polarization during a cycle of charging and discharging of the redox storage system, and the requisite of having a relatively high H+ discharge overvoltage when positively polarized in respect to the electrolyte solution and a high OH− discharge overvoltage when negatively polarized in respect to the electrolyte solution obliges to use carbon base electrodes.

A typical stack cell assembly contemplates a fluid impervious perm-ionic membrane cell separator, identical porous and fluid permeable carbon felt electrodes on both sides of the membrane separator in electrical contact with respective carbon base electrically conductive back plates, defining, together with nonconductive frames (commonly made of plastic), respective flow compartments of the positive electrolyte solution and of the negative electrolyte solution, respectively.

The conductive back plate most often is an inter-cell separator element according to the common architectural approach of a bipolar stack of a plurality of cell in electrical series between the two end elements. According to an alternative architectural approach (WO2004/079849), the conductive back plates of a multi-cell stack assembly separate the flow compartments of same sign of a plurality of interleaved, two face electrodes, electrically connected in parallel.

Mass transport to the electrodes must be assisted by a forced flow of the two electrolyte solutions through the respective porous electrode compartments. Of course, the pumping of electrolyte solutions represents "passive power" that significantly detracts from the overall power yield of every complete cycle of energy storage.

Generally, redox flow storage systems because of their peculiarity of not directly tying storage capacity to the size of the electrochemical reactors, are ideally suited for large storage facilities of electrical grid operators that must manage an increasingly great quota of discontinuous renewable energy sources connected to the grid like photovoltaic and wind power generators.

Nevertheless, large power ratings inevitably call for large cell (i.e. projected electrode area) being the maximum current density of operation of the cells limited by factors affecting the dynamics of ion charge and discharge reactions at the electrodes and the internal voltage drop due to the electrical cell resistance that tends to steeply increase at excessively high current densities.

The forced flow rate of the electrolyte solutions is increased when the current density increases or when the cell voltage drops in order to enhance the reaction dynamics at the electrodes by increasing irrigation of the porous mass of the partly compressed carbon felts though spending more power (passive power).

Normally the electrolyte solution enters the cell compartment through one or more inlet ports distributed along one side of a generally rectangular nonconductive frame or a nonconductive (unloaded plastic) frame portion of a molded back plate having a central portion (cell area) made of a moldable carbon loaded conductive aggregate, and exits the flow compartment through one or more outlet ports distributed along the opposite side of the nonconductive frame. The pump assisted circulation forces the solution through the pervious carbon felt electrode that substantially fills the whole cell area in order not to leave any by-pass flow paths unobstructed by the partly compressed felt.

A partial compression of the felt electrode between the perm-ionic membrane cell separator and the electrically conductive back plate, though increasing pressure drop, remains necessary for maintaining ad adequate electrical contact over the whole cell area that should promote a substantial equipotentiality of the working electrode, notwithstanding attempts to provide for a good contact in other ways.

Incidence of so many contrasting requisites and severe constraints on the choice of usable conductors because of electrochemical and chemical resistance considerations, has left the practitioner battling with the intrinsic non homogeneity of the compressed felt in terms of permeability (resistance to the liquid stream) that inevitably creates preferential flow paths through the porous electrode mass leaving portions of the electrode become "starved" of reducible (or oxidable) ions causing other portions to work at proportionately incremented current density and thence begin themselves to starve, in a unpredictably varying fashion. Over pumping the electrolyte solutions, besides dramatically lowering energy efficiency, seldom cures the problem and under certain conditions may even become ineffective.

Dramatically lowering the maximum rated current density of the cells may significantly lessen these problems, but the increased cell area requirement that has a major impact on investment may render competitively uneconomical the choice of a redox flow system.

Overcharging of negative electrolyte solution causes evolution of hydrogen gas, overcharging of the positive electrolyte causes evolution of oxygen that is destructive for the carbon felt electrode, moreover commonly used permionic membranes stem to an inevitable volumetric and ionic unbalance of the distinctly circulated solutions requiring periodic re-balancing of the two circuits.

Many instruments have been proposed to provide information on the conditions the electrochemical processes at the carbon felt electrodes take place, among which may be mentioned:

a) operation voltage of the individual cell (providing for dedicated external electrical voltage probe wires contacting each inter-cell conductive plate, in case of bipolar cell stacks) by ordinary voltmeters or equivalent instruments. A practice viable for test, but hardly compatible in commercial plants because is of associated risk of corrosions and/or leaks with such a wiring;
b) electrical current through the cells working in series by ordinary current meters or equivalent instruments;
c) open circuit voltage of cells, typically by circulating the two electrolyte solutions in a measuring cell;
d) state of charge of the electrolyte solutions by measuring the voltage difference between a probe electrode immersed in the electrolyte solution and a reference electrode immersed in a reference solution at substantially null state of charge, or by colorimetric analysis of the electrolyte solution, or by electrical conductivity measurements;
e) modifications of mass balance of solvent and ionic species in the two distinct electrolyte solutions, by chemical analysis.

So far even the most generous deployment of sophisticated instruments and techniques of assessment of electrical, chemical and electrochemical parameters that affects the charging and discharging processes taking place in the cells has failed to provide reliable information to eliminate the attendant risks of erratic failures of single cell of a multi cell stack, nor of observing erratic drops of overall efficiency, notwithstanding deliberate increases of the pumping rate, beyond any design limit, through the respective flow compartments of the cells. Phenomena these that tends to increasingly occur and to worsen from the moment of putting in operation the multi cell stack.

Commercially operated systems traditionally use bipolar cell stack assemblies. This normally impedes to monitor disuniformities of cell voltages or flow rates through the flow compartments of the single cell that may occur in any of the numerous cells in series of a bipolar cell stack. Any malfunctioning at felt electrode or membrane level is hardly detectable and too often stems to a failure of the whole stack. State of charge of the electrolyte solutions is normally monitored for the whole bipolar stack and with relatively complex implements that are hardly deployable at single cell level.

SUMMARY OF THIS DISCLOSURE

After a long experience of designing and testing redox flow battery systems, the applicants perceived that a notion derived from measurements of process parameters as done in known commercial systems, most of which provide a generally "averaged" value of the relevant parameter, of the would be conditions the electrochemical processes at the carbon felt electrodes of any specific cell of a battery stack take place may often be moot and as such to foster major failures.

Equipontentiality of carbon felt electrodes contacted via a conductive back plate or conductive inter-cell plate in generally multi-cell stack assemblies, against the surface of which the felt is compressively held, uniformity of mass transport of reacting ionic species of the redox couple used, and non-ideal homogeneity of electrical conductivity and permeability by the streaming electrolyte solution pumped there through from one perimeter side to the opposite perimeter side of the cell area, render any of the commonly gathered notions rather hypothetical to be at times useless.

To these unresolved problems plaguing the practice of redox flow storage systems the applicant has found a novel multi monopolar cell stack architecture and instruments having specific features that permit the operator or electronic controller to gather critical information to such a depth and enhanced reliability, to immediately identify any cell in "state of sufferance" and eventually to exclude it from the system and possibly substitute it with a spare monopolar cell stack.

In a preferred embodiment, the system has a classical monopolar cell electrical layout, substantially based on connecting a plurality of multi-electrode monopolar cell stacks in series between two common DC terminals of the multi cell system; the positive electrodes and the negative electrodes of each multi-electrode monopolar cell stack being respectively connected in common to positive and negative external DC rails that are connected in electrical series to the DC terminals of the storage system.

Preferably, each of said monopolar cell stack has a filter-press structure comprising a number of interleaved positive and negative electrode back plates of carbon felt electrodes of the monopolar cell compressed onto both sides of the respective electrically conductive back plate of current distribution to the felt except for the two end plates of the stack that distribute the current to only one felt electrode. Each back plate has an electrical connection stem or lug portion protruding out of the flow compartments that is connected to the respective external DC rail.

Differently from the traditional bipolar cell stack configuration where the voltage across any elementary cell may, for accidental causes, raise as much as easily surpass the limit (e.g. for an all vanadium redox flow system, about 1.6V) beyond which water electrolysis may start to become prevalent with an electrode destructive oxygen evolution and a potential risk of hydrogen and oxygen accumulation in the two electrolyte solutions circuits, with the monopolar cell stack configuration this is effectively prevented. Electric current splits itself among the five elementary cells of each of the five monopolar cell stack connected in series, while cell voltage remains constant for all five elementary cells of a stack and easily monitorable by external instruments.

A fluid impervious perm-ionic membrane interposed between two felt electrodes of opposite sign separates a flow compartment of an electrolyte solution of one sign from a flow compartment of an electrolyte solution of the opposite sign circulated to and from a respective storage tank through inlet nozzles and outlet nozzles hydraulically connected to respective distribution lines of the two electrolyte solutions to the plurality of multi-electrode and multi compartmented monopolar cell stacks.

A flow meter at the inlet or outlet of each of the two electrolyte solutions provides a measure of the rate of flow through each multi-electrode and multi compartmented monopolar cell stack and by monitoring the correctness of electrical current splitting among the singularly connected electrode back plates of the stack, an indirectly gathered information on sufficiency of electrolyte solution flow through every cell is obtained.

Minuscule probe electrodes of characteristics similar to those of the cell electrodes immersed in the streaming positive electrolyte solution and in the streaming negative electrolyte solution, respectively, at an inlet or outlet or preferably at both inlet and outlet of each multi-electrode and multi compartmented monopolar cell stack or of each flow compartment thereof, provide a measure of the open circuit cell voltage (OCV). Although, each probe electrode, if individually coupled with a standard (hydrogen) reference electrode wetted by the same streaming electrolyte solution, provides a direct measure of the state of charge of the electrolyte solution, the state of charge may be indirectly assessed without deployment of comparably expensive standard (hydrogen) reference electrodes.

The voltage differences measured between open circuit voltage (OCV) and the total cell voltage (TCV) measured at the connections to the DC rail provide a measure of the total effect of factors of irreversibility of the electrochemical processes taking place in each of the two electrolyte solutions, during a charge phase and during a discharge at a respective current load.

According to an enhanced monitoring embodiment, simple, externally deployed, current sensing means coupled to the electrical connection stem or lug of each back plate of current distribution to a respective felt electrode or electrodes, provide a measure of the current flowing through the single felt electrode or to the two felt electrodes coupled to the same back plate of every multi-electrode monopolar cell. Any discrepancy of the current flowing through any back plate of current distribution to the respective felt electrodes from the expected value, corresponding to the total current flowing through all the multi-electrode monopolar cell stacks in series, divided by the number of elementary cells (equivalent to the total number of back plates less one) and multiplied by two for the back plates interleaved to similar back plates of opposite sign, can be detected and monitored for eventually isolating the monopolar cell stack from the multi stack system and replacing it by enabling the operation of a stand-by spare monopolar cell stack.

Once electrically and hydraulically isolated from the system, any single monopolar cell stack that may have manifested a malfunctioning can be disassembled and checked for intervened causes of the malfunctioning, any clogging may be remedied or worn out or crushed felt electrode and/or an aged permionic membrane may be replaced. The refurbished multi-electrode monopolar cell stack may then be re-deployed in the system or kept as a stand-by cell ready to replace any other cell that in time may develop problems.

Moreover, the presence of probe electrodes at inlet and outlet of both electrolyte solutions of a cell or cell stack and the ability to measure the voltage difference between probe electrodes at inlet and outlet of the cell or cell stack, allows to monitor whether each single monopolar cell stack be functioning in the region of linearity of the voltage-state of charge characteristic, while charging as well as while discharging.

The applicant's invention is clearly defined in the annexed claims, the content of which is intended to be part of this specification and here incorporated by express reference.

DESCRIPTION OF EXEMPLARY EMBODIMENTS ILLUSTRATED IN THE DRAWINGS

Figure 1A:
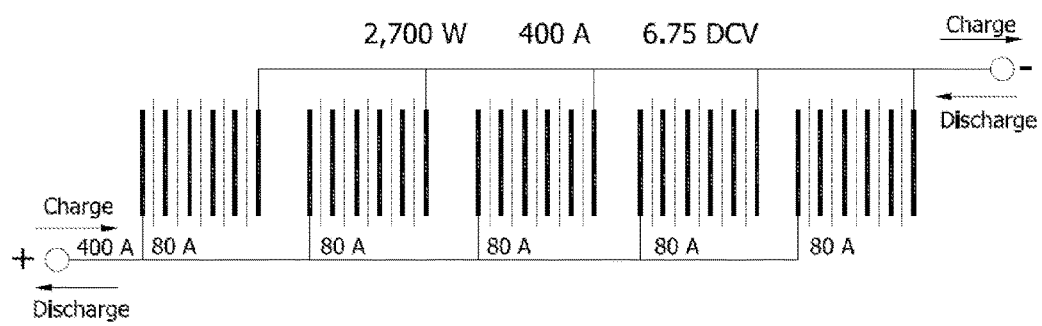
FIG. 1A is an electrical scheme relative to a redox flow multi bipolar cell stack system exemplarily composed of five distinct bipolar cell stacks, connected in series to a positive and a negative terminals, according to a traditional plant configuration.
Figure 1B:
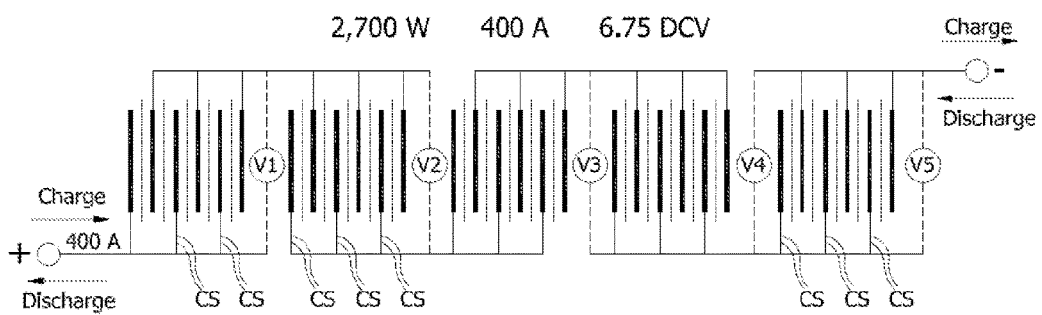
FIG. 1B is an exemplary electrical scheme relative to a redox flow multi monopolar cell stack system of this disclosure, comparable in terms of installed power to the plant of FIG. 1A, comprising five distinct monopolar multi compartmented cell stacks, connected in series to a positive and a negative terminals.

Differently from the substantial blindfoldness of the operator of a traditional bipolar cell stack plant configuration illustrated in FIG. 1A, in detecting in which of the five stacks any of the five bipolar cells in series may be malfunctioning with the risk of a destructive damage taking place and eventually leading to a plant downtime for carrying out investigations on each isolated stack, the multi monopolar cell stack architecture of this disclosure illustrated in FIG. 1B allows a truly in depth monitoring of the conditions of operation of the necessarily large number of stacks and of elementary cells a redox flow battery system requires.

FIG. 1B is an electrical scheme relative to a redox flow multi monopolar cell stack system of this disclosure that in a purely exemplary manner (with electrical ratings identical to those of the traditional configuration of FIG. 1A) comprises five distinct monopolar multi compartmented cell stacks, connected in series to a positive and a negative terminals.

As symbolically indicated, the arrangement makes possible to monitor the operating voltage (V1, V2, ... V5) of the five distinct monopolar cell stacks in electrical series. Moreover, besides the current flowing, exemplarily 400A, through the five monopolar multi compartmented cell stacks in series, common current sense means, cs, coupled onto the external electrical connecting stems of every electrically conductive back plate of electrical current distribution to felt electrodes of the five elementary cells of each monopolar multi compartmented cell stack, provide crucial information on the evenness of current splitting among the five elementary cells of the stack. The connection stem or tail portion of the conductive back plate constitutes an appropriate current sense resistance, on which monitoring a voltage drop proportional to the current carried to or from the respective external DC rail.

Figure 2:
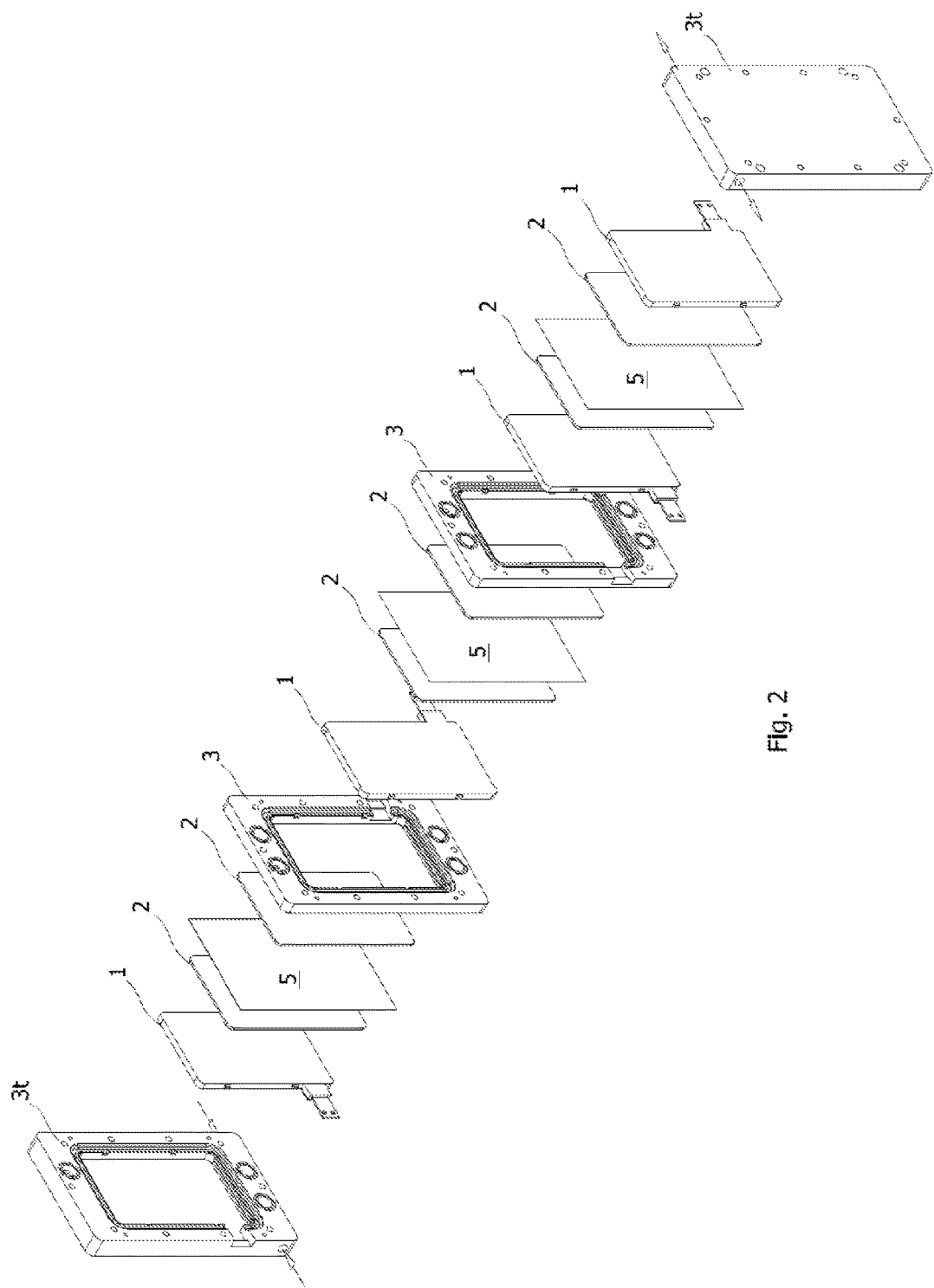
FIG. 2 is a basic schematic tridimensional exploded view of an exemplary multi compartmented cell stack that for brevity of illustration comprises only three perm-ionic membranes (i.e. elementary cells) instead of five as would be the case for each monopolar cell stack of the exemplary electrical scheme of FIG. 1.
Figure 3:
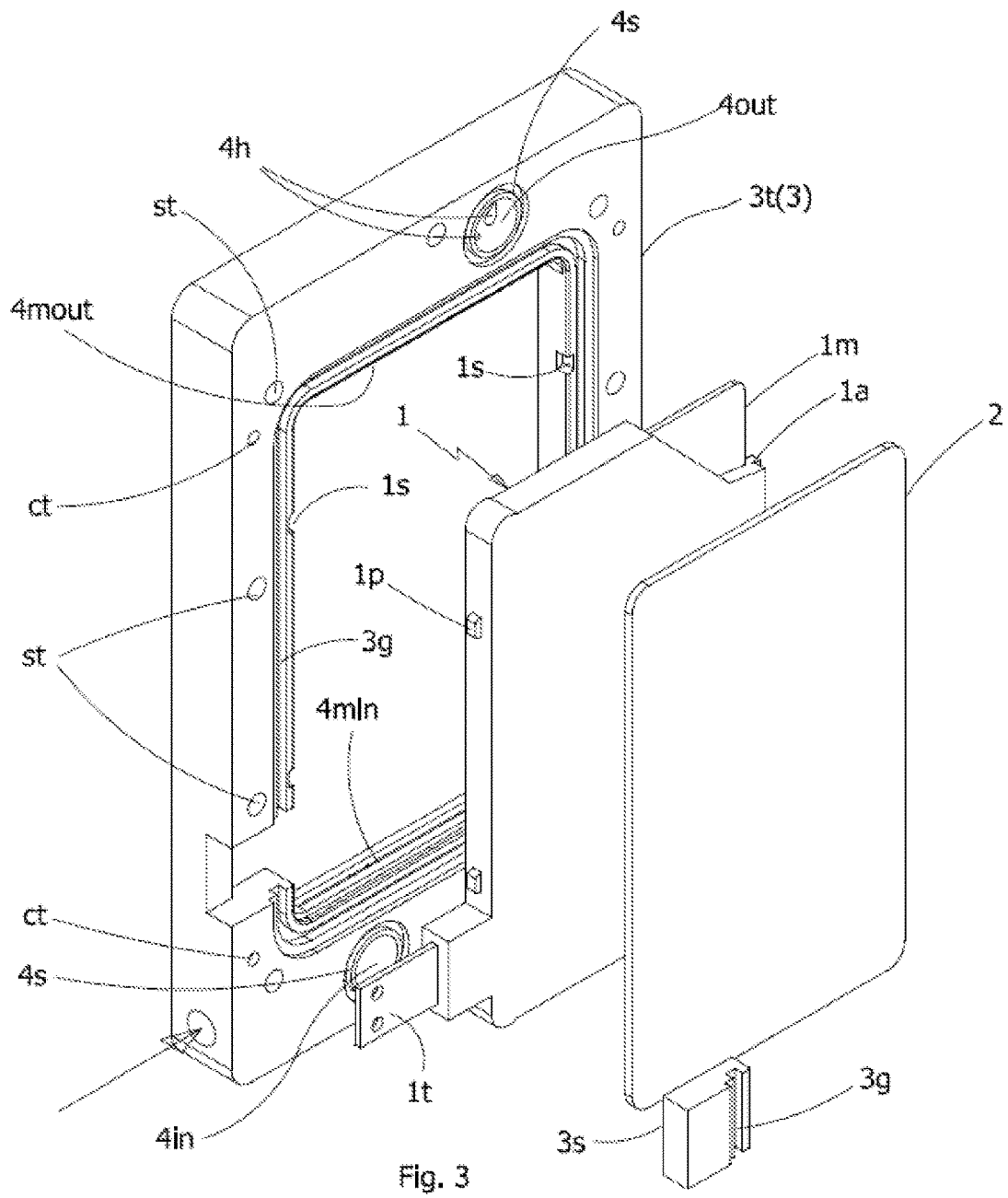
FIG. 3 is an enlarged detail of a header portion of FIG. 2

FIG. 2 is a schematic tridimensional exploded view of an exemplary multi compartmented cell stack that for brevity of illustration comprises only three perm-ionic membranes (i.e. elementary cells) instead of five as would be the case for each monopolar cell stack of the exemplary electrical scheme of FIG. 1B. FIG. 3 is an enlarged detail of a header portion of FIG. 2

The conductive back plate 1 must have an electrical current carrying cross section and conductivity adequate to ensure equipotentiality of DC current distribution or collection to and from the porous fluid permeable carbon felt electrode 2, pressed against the conductive surface of the back plate 1. Therefore, for the monopolar cell embodiment considered, the carbon base back plate may have, as shown, a metallic core 1m, completely sunk inside a molded body 1a of an electrically conductive aggregate of graphite and/or carbon powder and of a resin binder. The metallic core 1m emerges out of the molded body 1a only for a certain tract at the end of the lug projection 1t (well outside of the flow compartments and thus unaffected by the usually acid electrolyte solutions) for establishing a good contact with a DC rail (not shown in the drawing). Along the slender bare extension of the metal core of the molded carbon-resin aggregate, may be soldered wire leads, sufficiently spaced in the direction of the current flow, on which to measure the voltage drop.

Hydraulic seal around the perimeter of every flow compartment of the "filter-press" multi-cell stack architecture of the considered embodiment, is provided by counter-opposed O-rings pressing on the fluid impervious perm-ionic membrane separator of the two flow compartments of every cell. In the detail view of FIG. 3, is observable the groove 3g adapted to receive the respective O-ring.

A segment 3s of the grooved frame front (shown in the detail view of FIG. 3) is glued over the inner portion of the lug projection 1t and a filler finishing restores continuity of the O-ring groove around the whole perimeter of the flow compartment.

In the embodiment shown, the back plate 1 fits snuggly inside a contouring frame 3 (3t), that may be of nonconductive molded plastic, in consideration of the fact that no hydraulic seal between the homologous flow compartments (of same sign) on the opposite faces of the back plate is required. Keying pins 1p and cooperating sockets is in the inner flanks of the frame set and keep the back plate in place. Practically, in a monopolar multi cell stack arrangement, the externally connected conductive back plate 1 has the function of a current distributor or collector to and from homologous carbon felt electrodes 2 that are contacted over its opposite faces.

The internal ducting of the electrolyte solution that flows through the homologous (same sign) electrode compartments at the two sides of the back plate 1 is observable in the detail view of FIG. 3. The electrolyte stored in a tank is pumped through one duct and flows back to the tank through the other duct, in the drawing, the internal ducts 4in and 4out, respectively, that typically extend for the whole multi-cell stack assembly, traversing the sequence of plastic frames, hydraulic seal being provided by O-rings held in circular grooves 4s.

One transversal holes 4h, drilled in the plastic frame provide inlet ports and outlet ports, respectively, to and from the flow compartments over the two sides of the back plate 1. The port holes hydraulically connect the internal ducts, 4in and 4out pertaining to either the negative or positive electrolyte solution of the considered two electrode flow compartment of a monopolar cell (e.g. the first flow compartment of the three cell stack of FIGS. 2, 8 and 9), to a respective manifolding flow space 4min (and 4mout not visible in FIG. 3) that extends along the whole inner side of the generally rectangular frame.

Practically the streaming electrolyte solution entering the cell finds a space, 4min, in which distributing itself (inlet manifold) along one side of the rectangular back plate 1 and the streaming liquid finds a similar space in which collecting itself (outlet manifold) at the opposite side of the rectangular back plate 1, on its way out of the cell through the outlet port holes 4h and the outlet duct 4out.

The through holes ct in the frame are for pre-assembling bolts of the elements that compose a single cell and the through holes st are for the passage of tie rods that press together the pre-assemblies to form the complete multi-cell stack.

Figure 4:
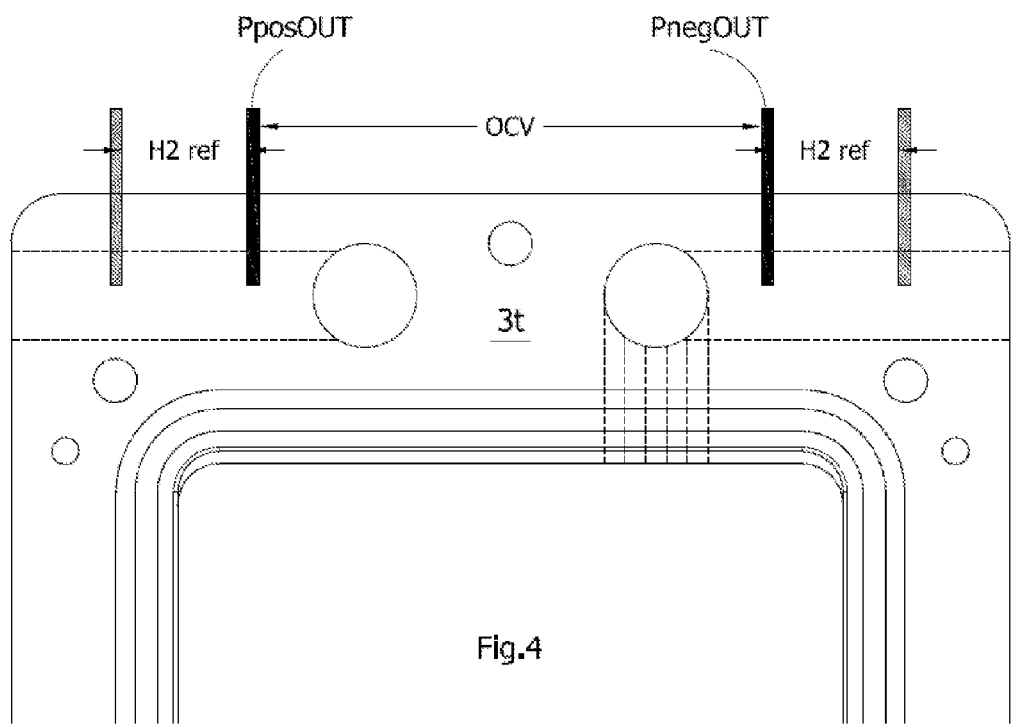
FIG. 4 shows a possible location of a probe electrode and of a hydrogen reference electrode in inlet or outlet ducts of the positive and negative electrolyte solutions, respectively, in a stack header frame of each monopolar multi compartmented cell stack of a multi monopolar cell system of this disclosure.

FIG. 4 shows a possible location of a probe electrode and optionally, as shown in the considered embodiment, also of a hydrogen reference electrode (or other equivalent reference such as an Ag/AgCl or calomel electrode) in the outlet ducts (alternatively in the inlet ducts or even in both) of the positive and negative electrolyte solutions, respectively, in the respective stack header frame of each monopolar multi compartmented cell stack of a multi monopolar cell system. According to an important feature of the system of this disclosure, the two probe electrodes of the two measuring pairs, recognizable by their darker tonality, have a wetted fluid permeable surface layer made of activated carbon, for example of the same carbon fibers of the activated carbon felt cell electrodes 2, bonded to a conductive carbon base core conductor (i.e. the connecting stem or tail portion of the probe electrode) or of other carbon base electrode material.

The voltage difference between the two probe electrodes provides a measure of the open circuit voltage OCV of the single monopolar multi compartmented cell stack. Moreover, as it will become clear in the ensuing description, the presence of only the probe electrodes and the ability to measure the voltage difference between a probe electrode at the outlet (alternatively at the inlet or even at both) of a respective electrolyte solution of a first sign and the multi-electrodes of the monopolar cell stack of opposite sign, besides providing an indirect though reliable assessment of the state of charge of the two electrolyte solutions, it allows to derive useful information on the performance of the felt electrodes 2 and of the perm-ionic membrane separators 5 of the single monopolar multi compartmented cell stack.

Of course, if together with the probe electrodes of activated carbon fibers also hydrogen or equivalent reference electrodes, recognizable by their lighter tonality, are deployed in header ducts of a single monopolar cell stack, the state of charge of each electrolyte solution is measured, in absolute (direct) terms, by the voltage difference between the probe electrode and the reference electrode wetted by the same electrolyte solution. Such multiple direct measurements of the state of charge by introducing reference electrodes are possible options, however, according to an important feature of the novel system, a substantially equivalent information in relative (indirect) terms may be gathered without deploying the numerous reference electrodes that would be required (at least two for each monopolar cell stack).

Figure 5:
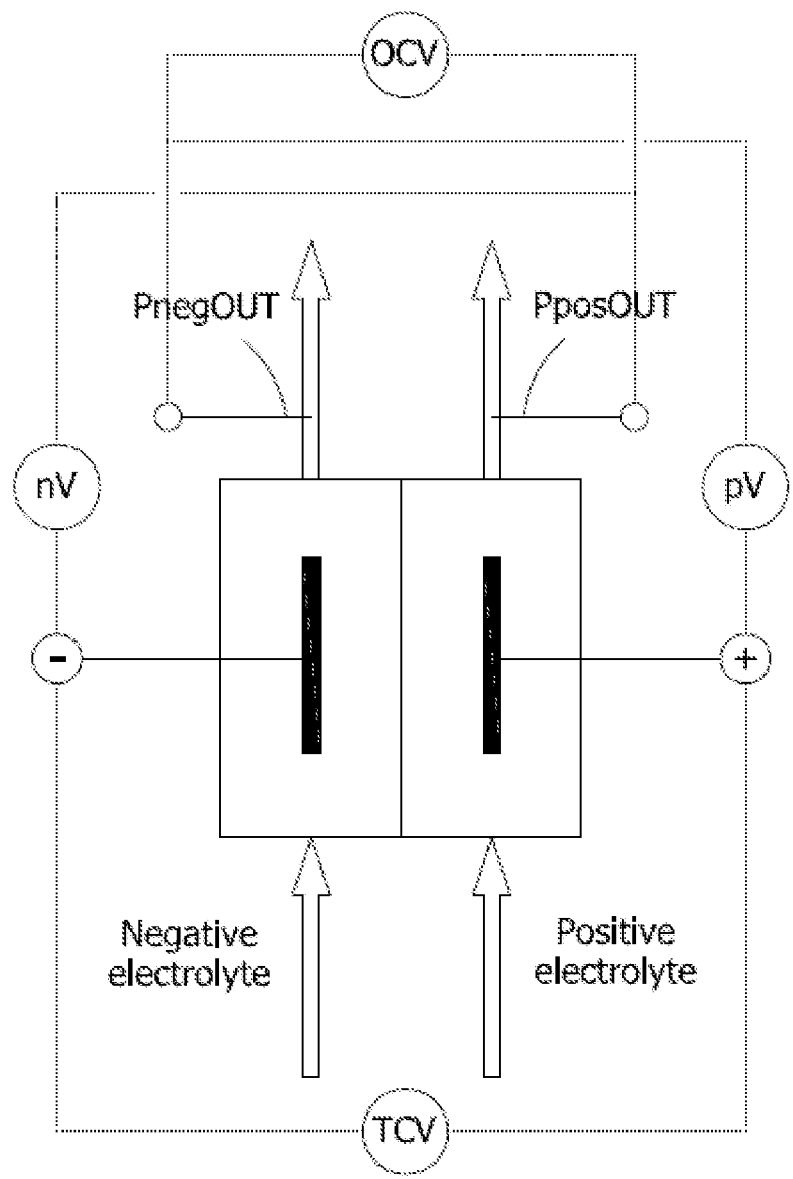
FIG. 5 is a schematic representation of a single cell and of the electrical voltage quantities that are monitored, according to this disclosure.

FIG. 5 symbolically represents a single monopolar multi compartmented cell stack and shows the electrical voltage quantities that are monitored, according to this disclosure.

The difference between pV and OCV represents the voltage drop in the membrane plus the resistance and the overvoltage at the electrode traversed (flown through) by the positive electrolyte solution (in other words the effect of the factors of irreversibility related to the cathodic half-cell, during a charge phase, and to the anodic half-cell, during a discharge phase); while the difference between nV and OCV represents the voltage drop across the membrane plus the resistance and the overvoltage at the electrode traversed by the negative electrolyte solution (in other words the effect of the factors of irreversibility related to the anodic half-cell, during a charge phase, and to the cathodic half-cell, during a discharge phase).

Therefore, the ability to measure the quantities pV and nV by virtue of the deployment of the respective probe electrodes, makes possible to discriminate whether there is a problem with the electrodes of either one or the other sign.

Moreover, the difference between the total cell voltage TCV of the single monopolar cell stack and its open cell voltage OCV gives a global measure of the irreversibility of the charging process and of the discharging process (at the respective current load) of the single stack.

Figure 6:
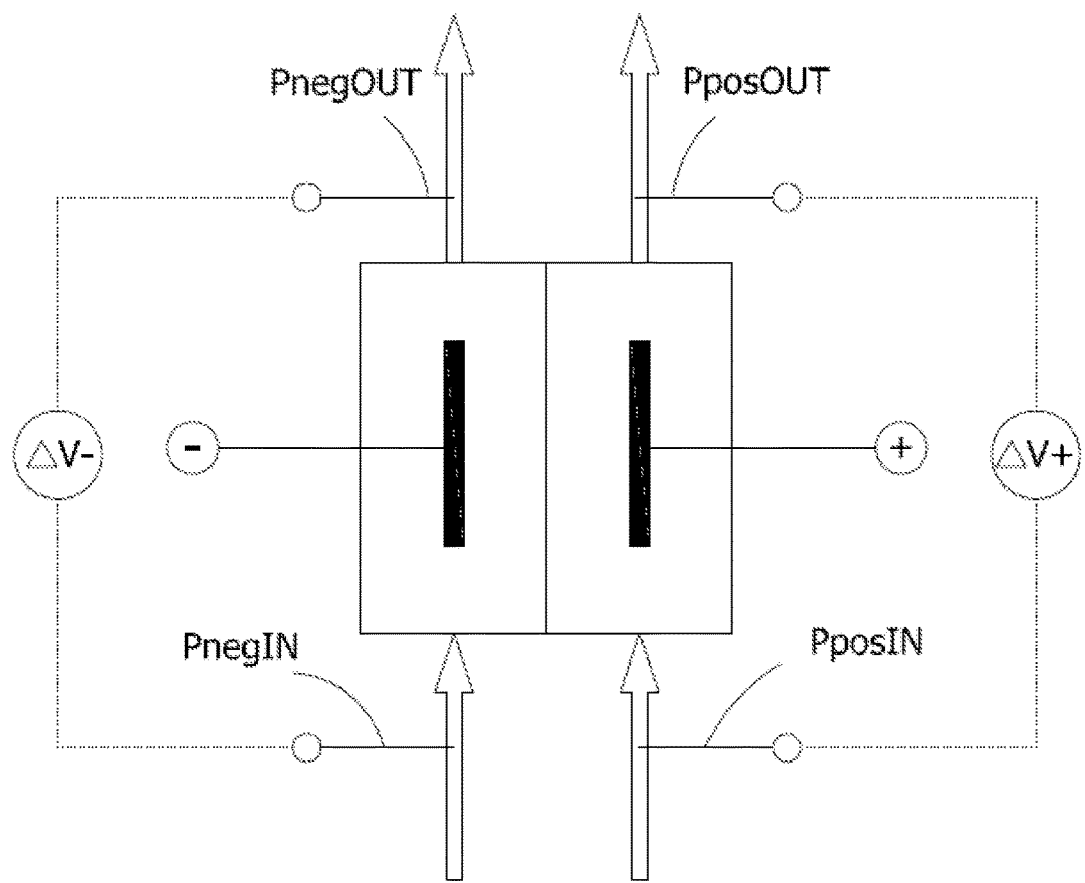
FIG. 6 is a scheme that illustrates how safe operation in the region of linearity of the voltage-state of charge characteristic may be monitored according to this disclosure.

Using, as in FIG. 5, a symbolic representation of a single monopolar multi compartmented cell stack, FIG. 6 illustrates how safe operation of each single monopolar cell stack, in the region of linearity of the voltage-state of charge characteristic, may be monitored according to this disclosure by deploying probe electrodes at both inlets and outlets of a functioning elementary cell or monopolar cell stack.

If, during a charging phase, the monopolar multi compartmented cell stack is functioning in the region of linearity of the voltage-state of charge characteristic, the voltage differences, $\Delta V-$ and $\Delta V+$, between probe electrodes wetted by the same electrolyte solution at inlet and at outlet, respectively, is proportional to the load and inversely proportional to the flow rate of electrolyte. At constant current and flow, these voltage differences ($\Delta V-$ and $\Delta V+$) remain constant as far as the cell remains functioning in the region of linearity of the voltage-state of charge characteristic.

If these voltage differences begin to become higher and higher in both the negative and positive electrolyte solutions flowing through the respective cell compartments, it means that both electrolyte solutions are being overcharged, though their state of charge remains balanced.

Differently, if only the voltage difference in only one electrolyte solution begins to rapidly raise while the voltage difference in the other electrolyte solution remains rather constant or raises at a comparably low rate, it means that the two electrolyte solutions are not balanced and the one shoving a fast increase of voltage difference has a higher state of charge than the other. When this occurs (and it normally does for the positive electrolyte solution) and the voltage difference $\Delta V+$ becomes higher and higher at the same flow rate, it is a clear indication that the positive electrolyte solution has reached the limit state of charge. This requires that the two electrolytes be rebalanced or suspension of the charging phase.

Commonly, rebalancing of the electrolyte solutions is a simple operation that requires a small membrane cell with an electrode of titanium coated with mixed oxides of Ta—Ir, suitable for oxygen evolution (that is showing a rather low overvoltage of discharge of $OH+$ ions). Thus, by flowing through the compartment of a negatively biased electrode of the membrane cell, the positively charged electrolyte solution undergoes a reduction. In fact, the unbalancing is generally caused by parasitic evolution of hydrogen at the negative electrodes or by oxidation of the negative electrolyte by the air it may come into contact inside the storage tank. Therefore, the rebalancing is normally done exclusively on the positively charged electrolyte solution reducing it by passing a small fraction of the positively electrolyte in the negative electrode compartment of a relatively small membrane cell separated from the positive electrode compartment by a cation exchanging membrane (e.g. Nafion®, a registered trade name of E.I. Du Pont de Nemours), into which the electrolyte solution may be just water such that oxygen is evolved on the positive titanium electrode because of a water electrolysis process.

Figure 7:
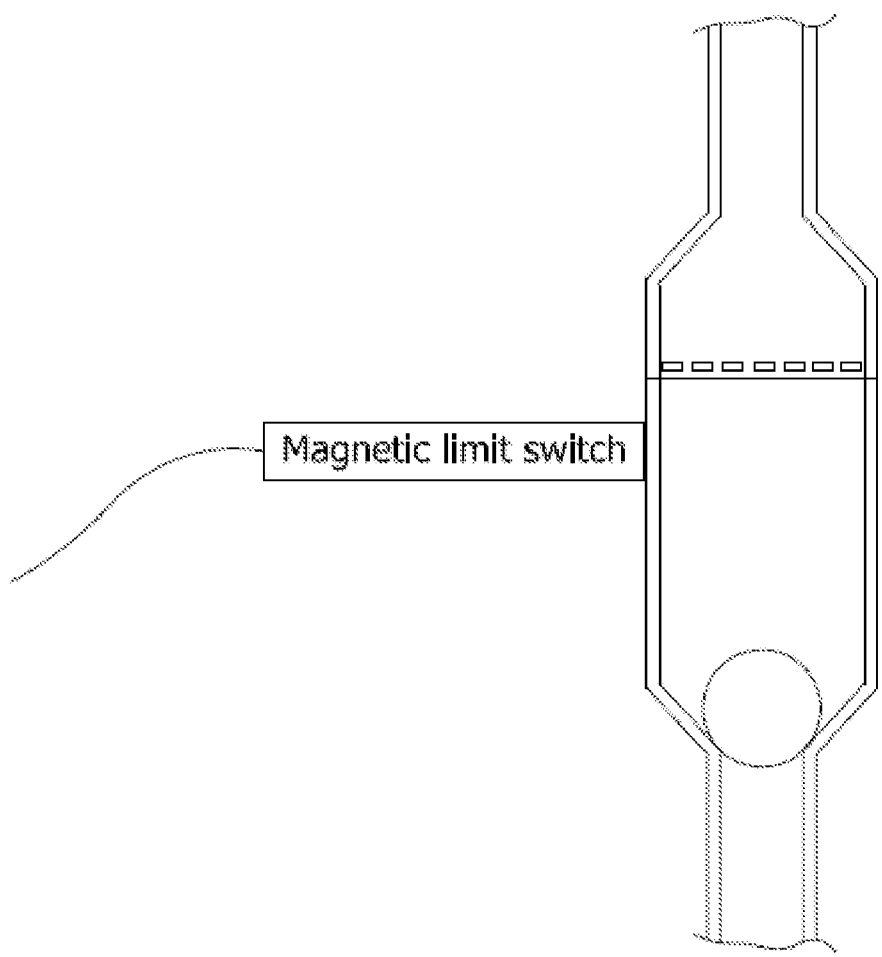
FIG. 7 shows a simple flow detector that may be deployed in the inlet or outlet flow pipes of each monopolar multi compartmented cell stack of a multi monopolar cell system of this disclosure.

The fact that every flow compartment of a monopolar cell stack is hydraulically connected to respective electrolyte solutions circulation pipelines, a simple flow detector as schematically depicted in FIG. 7 may be deployed in inlet or outlet flow pipes of each compartment or, as in the considered example of stack structure illustrated in the drawings, of each monopolar cell stack of the storage system of this disclosure. Monitoring the correctness of flow of both electrolyte solutions through every multi-compartmented cell stack provides another important information for preventing destructive conditions to go unchecked. Even if flow detectors are deployed for a whole monopolar multi-compartmented cell stack, an indirect monitoring of correctness of flow through every single compartment is gathered by monitoring the current load on the respective stem or lug portion of each conductive back plate for detecting any unbalancing of the total current load splitting among the five elementary cells of each monopolar cell stack of the illustrated embodiment, the possible causes of which could be also a clogging or any reduction of flow in one of the flow compartments of the stack (besides a possible failure of an electrode or a degraded perm-ionic membrane related to the suffering elementary cell).

Figure 8:
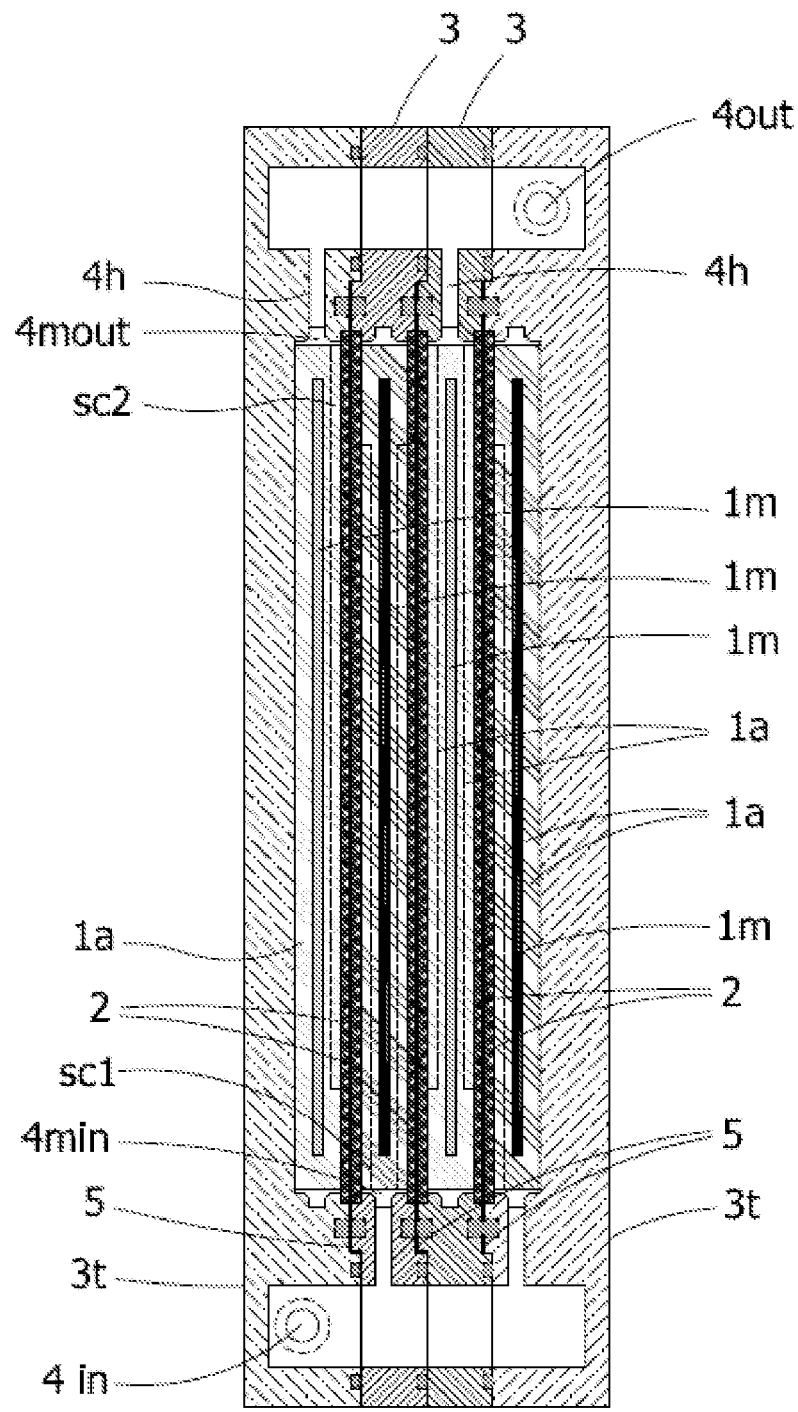
FIG. 8 is a cross sectional view of the "filter-press" tightened cell stack of FIG. 2, showing the positive electrolyte solution distribution ports, in and out of a respecting positive electrode flow compartments of the three elementary cells.

FIG. 8 is a cross sectional view of the "filter-press" tightened cell stack of FIG. 2, showing the positive electrolyte solution distribution ports, in and out of a respecting positive electrode flow compartments of the three elementary cells.

Figure 9:
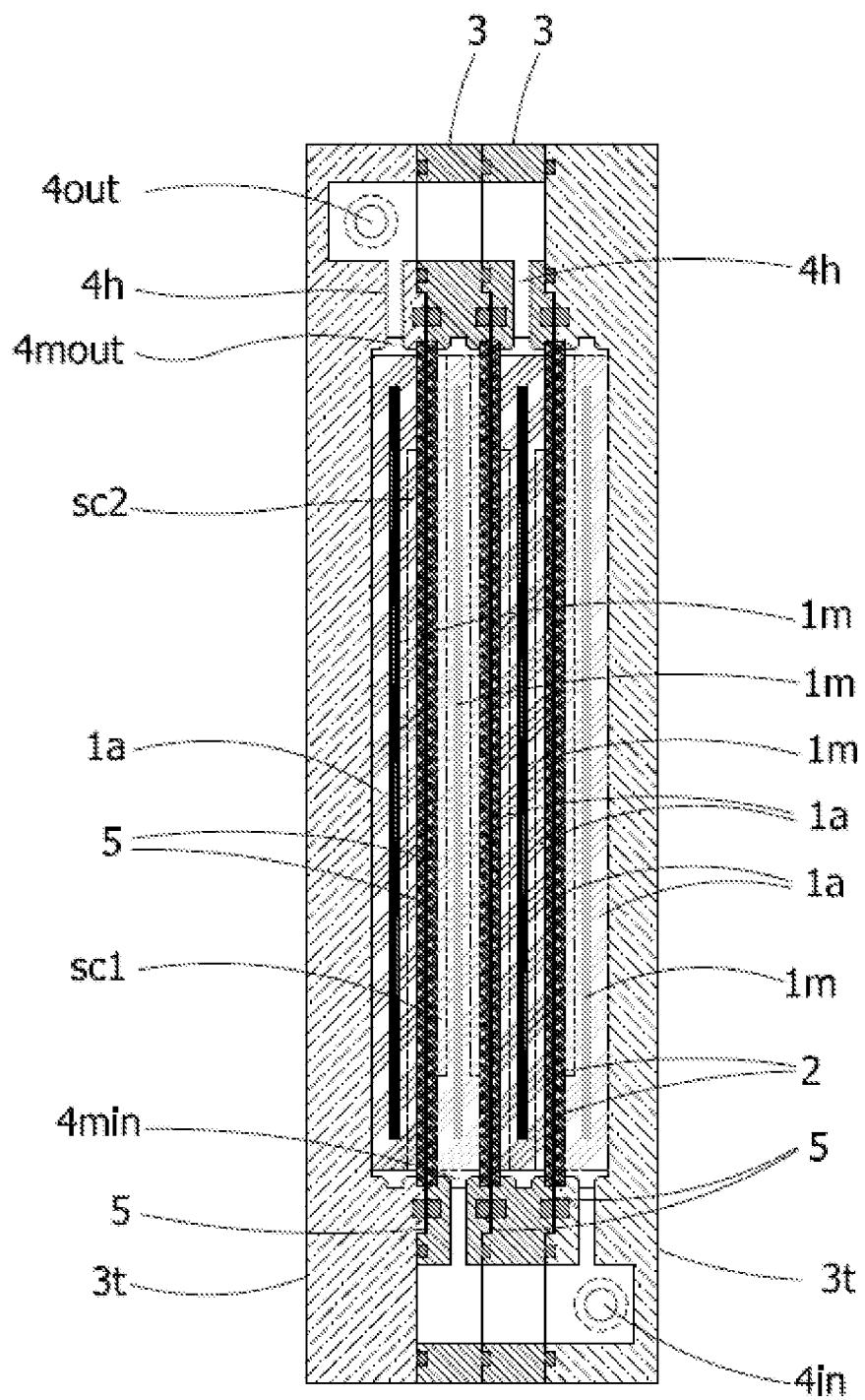
FIG. 9 is a cross sectional view of the "filter-press" tightened three cell stack of FIG. 2, showing the negative electrolyte solution distribution ports, in and out of a respecting negative electrode flow compartments of the three elementary cells.

FIG. 9 is a cross sectional view of the "filter-press" tightened three cell stack of FIG. 2, showing the negative electrolyte solution distribution ports, in and out of a respecting negative electrode flow compartments of the three elementary cells.

Figure 10:
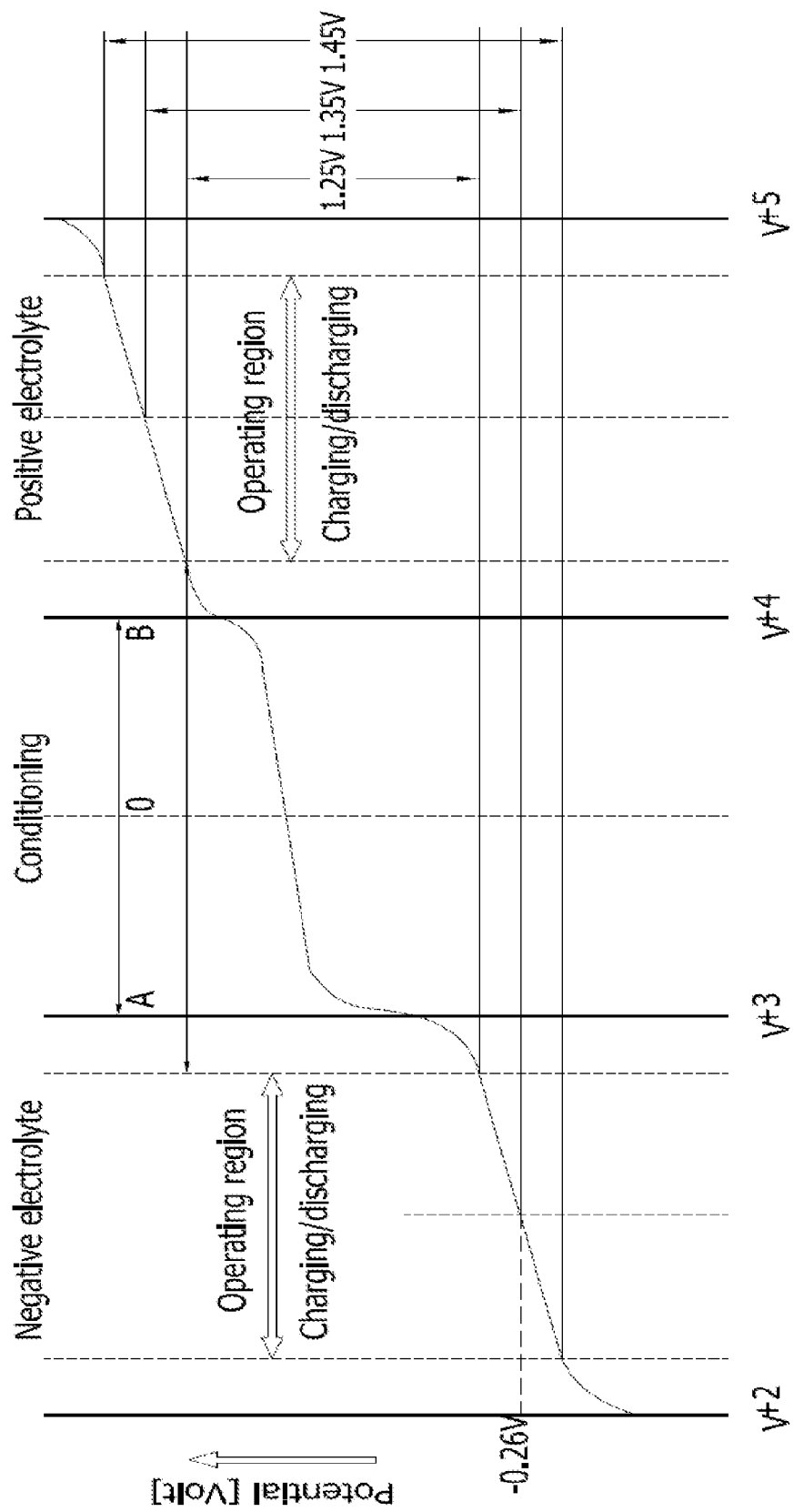
FIGS. 10, 11 and 12 are electrochemical potential diagrams exemplifying the measured quantities and how relevant limit thresholds may be established for a punctual intervention of a process controller.

Taking in consideration, as an example, an all-vanadium redox flow battery system, a graph representation of the state of charge of the negative and positive electrolyte solutions containing the same molarities of dissolved vanadium (usually in a sulfuric acid solution), across the three regions defined by the different ionic states of vanadium, is shown in FIG. 10, and the corresponding voltages referred to a standard hydrogen reference.

Figure 11:
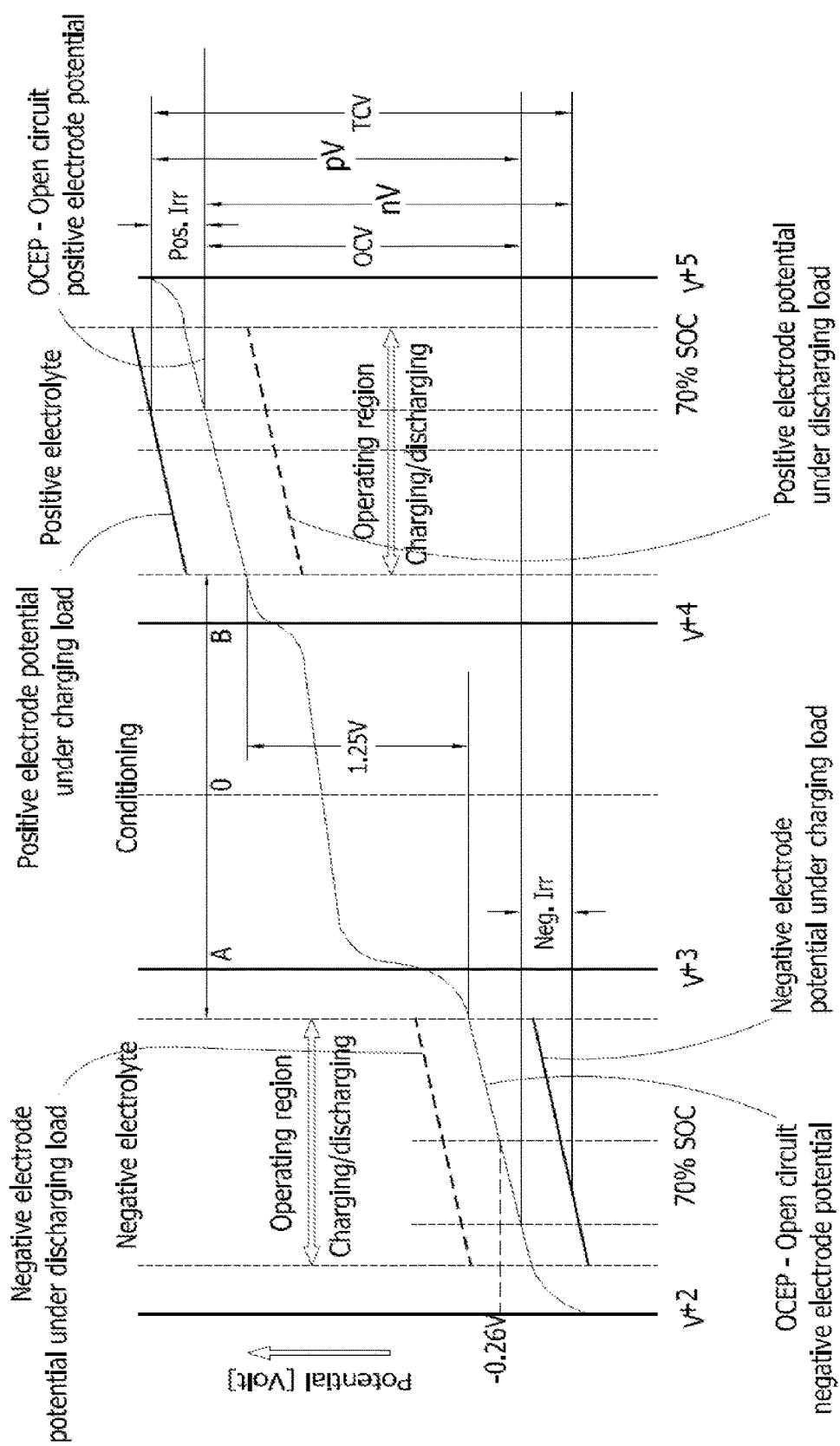

FIG. 11 reproduces the graph of FIG. 10 with the indications of the distinct contributions to the total cell voltage TCV when functioning at a certain current load, during a charging phase at a state of charge (SOC) of about 70%. The monitored voltages, according to this disclosure, are identified in the graph together with the indications of the effects of factors of irreversibility of the half-cell processes: at the negative electrodes and at the positive electrodes of a monopolar cell stack.

$P_{OS}$-$I_{RR}$ represents the voltage penalty because of resistive effects in the membrane, ohmic resistance in the positive electrode (intended here as the combination of resistances of the connection stem or tail portion and back plate, contact resistance and effective resistance of the conductive carbon felt layer) and of the electrochemical overvoltage of oxidation of dissolved vanadium at the positive electrode (i.e. positive side irreversibility of the charging process). Similarly, $N_{EG}$-$I_{RR}$ represents the voltage penalty because of resistive effects in the membrane, ohmic resistance in the negative electrode (intended here as the combination of resistances of the connection or tail portion and back plate, contact resistance and effective resistance of the conductive carbon felt layer) and of the electrochemical overvoltage of reduction of dissolved vanadium at the negative electrode (i.e. negative side irreversibility of the charging process).

Figure 12:
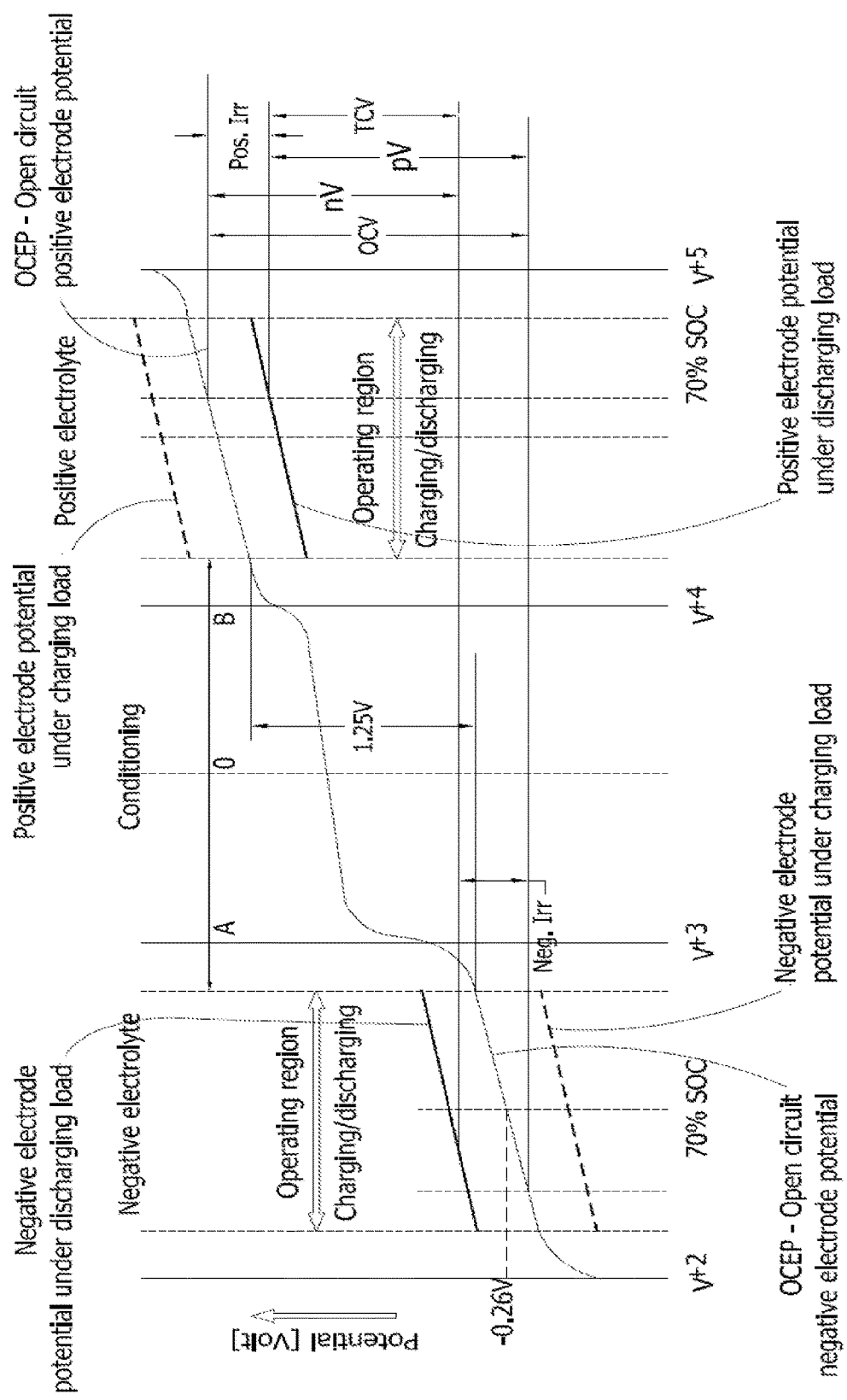

FIG. 12 reproduces the graph of FIG. 10 with the indications of the distinct contributions to the total cell voltage TCV when functioning at a certain current load, during a discharging phase at a state of charge (SOC) of about 70%. The monitored voltages, according to this disclosure, are identified in the graph together with the indications of the effects of factors of irreversibility of the half-cell processes: at the negative electrodes and at the positive electrodes of a monopolar cell stack.

$P_{OS}$-$I_{RR}$ represents the voltage penalty because of resistive effects in the membrane, ohmic resistance in the positive electrode (intended here as the combination of resistances of the connection stem or tail portion and back plate, contact resistance and effective resistance of the conductive carbon felt layer) and of the electrochemical overvoltage of reduction of dissolved vanadium at the positive electrode (i.e. positive side irreversibility of the discharging process). Similarly, $N_{EG}$-$I_{RR}$ represents the voltage penalty because of resistive effects in the membrane, ohmic resistance in the negative electrode (intended here as the combination of resistances of the connection stem portion and back plate, contact resistance and effective resistance of the conductive carbon felt layer) and of the electrochemical overvoltage of oxidation of dissolved vanadium at the negative electrode (i.e. negative side irreversibility of the discharging process)

As will be immediately evident to the skilled reader, the indication of the correspondence of the process parameters and real time conditions of operation of the cells of the redox flow battery system with the quantities instrumentally monitored according to this disclosure, as also graphically depicted in FIG. 11 for a charge phase and in FIG. 12 for a discharge phase, clearly and non-ambiguously teaches also the control algorithms that may be consequently implemented according to the improved method of controlling such an energy storage system, by fixing appropriate threshold values for the various monitored quantities or the algorithms with which certain thresholds may be adaptively set in function of other parameters such as the current load, while charging or while discharging, and temperature.

Circuit breakers in the external electrical connections to the DC rails, solenoid valves in the derivation pipes to the individual monopolar cell stacks and switched by-pass resistors for discharging the volumes of electrolyte solutions contained in the flow compartments of a disconnected cell stacks, controlled by a central plant controller, permit to isolate electrically a monopolar cell stack that may be manifesting improper operating conditions, as well as connecting and coupling in a spare monopolar cell stack of a number of redundant stand-by monopolar cell stacks. Besides providing for easy and reliable (even fully automatic) substitution of a failing cell stack, redundancy may allow adaptive optimization of both charge and discharge processes in function of the current load.

The embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A redox flow battery system for energy storage comprising distinct positive and negative electrolyte solution circuits of forced circulation of the electrolyte solutions to and from a storage tank through respective flow compartments accommodating, respectively, a positive felt electrode and a negative felt electrode separated by a fluid impervious perm-ionic membrane, of a plurality of monopolar cell stacks electrically connected in series between positive and a negative DC terminals, each monopolar cell stack or each elementary cell thereof having inlet nozzles and outlet nozzles hydraulically connected to respective distribution lines of the two electrolyte solutions, each monopolar cell stack comprising a number of positive electrode back plates interleaved with negative electrode back plates, each with an electrical connection stem or tail portion protruding out of the respective flow compartment, connected to a respective external DC rail, assembled to constitute a multi-electrode multi-compartmented monopolar cell stack, the system comprising probe electrodes immersed in each of the two streaming electrolyte solutions, at a respective inlet or outlet of each monopolar cell stack or each elementary cell thereof, for measuring the open circuit cell voltage (OCV) of each monopolar cell stack or each elementary cell thereof;

external measuring implements of the total cell voltage (TCV) of said plurality of monopolar cell stacks;

external measuring implements of two voltage differences (pV, nV) between a probe electrode immersed in the streaming negative electrolyte solution and the positive back plates of each-monopolar cell stack or each elementary cell thereof, and between a probe electrode immersed in the streaming positive electrolyte solution and the negative back plates of each monopolar cell stack or each elementary cell thereof, respectively;

external measuring implements of the differences between total cell voltage (TCV) and said two voltage differences (pV, nV), respectively; and a data processor of said measured quantities and voltage differences adapted to signal anomalous surpassing of critical thresholds in any of said monopolar cell stacks.

2. The redox flow battery system of claim 1, wherein probe electrodes are immersed in each of the two streaming electrolyte solutions at both inlet and outlet to and from respective flow compartments of each monopolar cell stack or each elementary cell thereof; and external measuring implements of the voltage differences between the probe electrodes wetted by the same electrolyte solution at inlet and at outlet, respectively, to be additionally input to said data processor.

3. The redox flow battery system of claim 1, further comprising a current sensor in said electrical connection stem or tail portion of each conductive back plate, adapted to monitor the current flowing in each cell electrode of each monopolar cell stack or each elementary cell thereof, to be additionally input these current measurements to said data processor.

4. The redox flow battery system of claim 1, further comprising flow detectors through the respective flow compartments of the two distinct electrolyte solutions, the state of which to be additionally input to said data processor.

5. The redox flow battery system of claim 1, further comprising a dedicated electrolytic cell for periodically rebalancing the state of charge of the positive electrolyte solution in respect of the state of charge of the negative electrolyte solution, when signaled by said data processor, having an anode adapted to support oxygen evolution and a cathode separated by a fluid impervious cation exchange membrane and flow diverter adapted to flow a fraction of the circulating stream of positive electrolyte solution through the anode compartment of the electrolytic cell for reducing the positive electrolyte solution.

6. A method of controlling operation of a redox flow battery system for energy storage comprising distinct positive and negative electrolyte solution circuits of forced circulation of the electrolyte solutions to and from a storage tank through respective flow compartments accommodating, respectively, a positive felt electrode and a negative felt electrode separated by a fluid impervious perm-ionic membrane, of a plurality of monopolar cell stacks electrically connected in series between positive and a negative DC terminals, each monopolar cell stack or each elementary cell thereof having inlet nozzles and outlet nozzles hydraulically connected to respective distribution lines of the two electrolyte solutions, each monopolar cell stack comprising a number of positive electrode back plates interleaved with negative electrode back plates, each with an electrical connection stem or tail portion protruding out of the respective flow compartment, connected to a respective external DC rail, assembled to constitute a multi-electrode multi-compartmented monopolar cell stack, comprising the steps of measuring the open circuit cell voltage (OCV) of probe electrodes, immersed in each of the two streaming electrolyte solutions, at a respective inlet or outlet of each monopolar cell stack or each elementary cell thereof;

measuring the total cell voltage (TCV) of said plurality of monopolar cell stacks;

measuring two voltage differences (pV, nV) between a probe electrode immersed in the streaming negative electrolyte solution and the positive back plates of each monopolar cell stack or elementary cell thereof, and between a probe electrode immersed in the streaming positive electrolyte solution and the negative back plates of each monopolar cell stack or elementary cell thereof, respectively;

measuring the differences between total cell voltage (TCV) and said two voltage differences (pV, nV), respectively; and processing said measured quantities and voltage differences and signaling anomalous surpassing of preset critical thresholds.

7. The method of controlling operation of a redox flow battery system of claim 6, wherein probe electrodes are immersed in each of the two streaming electrolyte solutions at both inlet and outlet to and from respective flow compartments of a monopolar cell stack or of each elementary cell thereof, further comprising the steps of external measuring implements of the voltage differences between the probe electrodes wetted by the same electrolyte solution at inlet and at outlet, respectively; and monitoring for increases of the measured voltage differences denoting reach of a limit state of charge and for dissimilarity between rates of increment for the two distinct electrolyte solutions denoting unbalancing of their state of charge.

8. The method of controlling operation of a redox flow battery system of claim 6, further comprising the steps of measuring with a current sensor, coupled to said electrical connection stem or tail portion of each conductive back plate, the current flowing in each cell electrode of a monopolar cell stack; and monitoring for dissimilarities among the measured voltage differences denoting modifications of the performance of one or more elementary cells of the monopolar cell stack.

* * * * *